US006958976B2

(12) United States Patent
Kikkawa et al.

(10) Patent No.: US 6,958,976 B2
(45) Date of Patent: Oct. 25, 2005

(54) ABNORMALITY DETECTION METHOD AND SYSTEM HAVING SLEEP MODE CHECK FUNCTION

(75) Inventors: Hajime Kikkawa, Nagoya (JP); Tomohisa Kishigami, Obu (JP); Jiro Sato, Kariya (JP); Shinichi Senoo, Kariya (JP)

(73) Assignee: Denso Corporation, Kariya (JP)

( * ) Notice: Subject to any disclaimer, the term of this patent is extended or adjusted under 35 U.S.C. 154(b) by 839 days.

(21) Appl. No.: 09/877,079

(22) Filed: Jun. 11, 2001

(65) Prior Publication Data

US 2002/0012325 A1 Jan. 31, 2002

(30) Foreign Application Priority Data

Jul. 27, 2000 (JP) ............................. 2000-226961

(51) Int. Cl.[7] ............................................ G06F 11/00
(52) U.S. Cl. ...................... 370/241; 370/311; 340/438; 340/506; 340/901; 701/31; 701/34
(58) Field of Search ................................. 370/241–251, 370/311; 701/29–35; 340/901, 425.5, 438, 340/506

(56) References Cited

U.S. PATENT DOCUMENTS

| 5,388,045 | A | * | 2/1995 | Kamiya et al. | ............... 701/35 |
|---|---|---|---|---|---|
| 5,757,773 | A | | 5/1998 | Tsuji | |
| 6,127,741 | A | * | 10/2000 | Matsuda et al. | ............... 307/36 |
| 6,285,931 | B1 | * | 9/2001 | Hattori et al. | ................ 701/29 |
| 2002/0002429 | A1 | * | 1/2002 | Sugimura et al. | ............. 701/29 |
| 2002/0006139 | A1 | * | 1/2002 | Kikkawa et al. | ............ 370/502 |
| 2004/0046651 | A1 | * | 3/2004 | Norimatsu | ................... 340/445 |

FOREIGN PATENT DOCUMENTS

| JP | 6-38276 | | 2/1994 | | |
|---|---|---|---|---|---|
| JP | 06-102148 A | * | 4/1994 | .......... G01M 17/00 |
| JP | 11-332086 | | 11/1999 | | |
| JP | 11-341572 | | 12/1999 | | |

* cited by examiner

Primary Examiner—Brian Nguyen
Assistant Examiner—Tri H. Phan
(74) Attorney, Agent, or Firm—Posz Law Group, PLC

(57) ABSTRACT

A plurality of electronic control units is continuously supplied with electric power to be capable of communication one another even when respective controlled devices are in inoperative condition. Each ECU transmits a sleep NG information along with its device ID when it not allowed to remain in the sleep mode. An abnormality detection unit connected to the ECUs through communication lines monitors the sleep NG information of each ECU to detect the ECU remaining activated for more than a wait period which is required for the ECU to shift to the sleep mode. The device ID of the ECU which is detected as remaining activated is stored in a memory so that any abnormal location may be specified by the stored device ID.

7 Claims, 6 Drawing Sheets

ABNORMALITY DETECTION METHOD AND SYSTEM HAVING SLEEP MODE CHECK FUNCTION

CROSS REFERENCE TO RELATED APPLICATION

This application is based on and incorporates herein by reference Japanese Patent Application No. 2000-226961 filed on Jul. 27, 2000.

BACKGROUND OF THE INVENTION

The present invention relates to an abnormality detection method and system which detect abnormality by checking sleep mode operations of electronic control units for electronically controlled devices.

Recent automotive vehicles use a multiplex communication system to reduce wire harnesses that connect electronic control units (ECUs) one another. In the multiplex communication system, a network is formed by connecting the ECUs as nodes via a common multiplex communication line so that the ECUs execute data communication through the multiplex communication line. The ECUs for similar controls are preferably grouped to form a plurality of networks for improving data communication in the vehicle. In this case a data relay device is provided to enable data communication among the ECUs in different networks. One of the ECUs is used as an abnormality monitoring unit that collects information of abnormality occurring in the ECUs or ECU-controlled devices based on data frames transmitted from the ECUs.

JP-A-11-341572 proposes one abnormality detection system that circulates a check memory in a network. The check memory has the same number of data bits as that of ECUs of the network. Each ECU sets a flag in a bit allocated therefor when the check memory is circulated thereto, and transmits the check memory to another ECU of the next address. If the ECU receives no confirmation frame from the ECU of next address, the ECU transmits the check memory to the ECU of the further next address. Thus, this abnormality detection system specifies an ECU having an abnormality based on the flag of the check memory after the check memory is circulated once.

JP-A-11-332086 proposes another abnormality detection system in which a power supply line is arranged in parallel with a multiplex communication line that connects ECUs. The communication line is influenced by an abnormality in the power supply line, resulting in abnormality in the communication line. Thus this abnormality detection system detects the abnormality in the power supply by monitoring the number of abnormalities in the communication line.

These proposed systems are however incapable of detecting abnormalities of ECU-controlled devices as long as the ECUs for the vehicle devices operate normally to transmit the data frames.

SUMMARY OF THE INVENTION

It is therefore an object of the present invention to provide an abnormality detection system capable of detecting abnormalities occurring only in ECU-controlled devices.

According to the present invention, a network is constructed with a plurality of electronic control units for respective controlled devices. The control units are constructed to shift to a sleep mode after a predetermined wait period under a condition that no unit activation cause is present, and transmit respective data frames. The data frame includes ECU identification information and sleep not good ("NG") information indicative of sleep disablement when the ECU activation cause is present. An abnormality detection unit is connected to the network through a communication line for collecting abnormality monitor information of the controlled devices based on the transmitted data frames. The detection unit detects a transition of the controlled devices from an operation condition to an operation stop, and monitors the transmitted sleep NG information after the controlled devices shifted to the operation stop condition thereby to detect the control unit which remains activated after the predetermined wait time.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
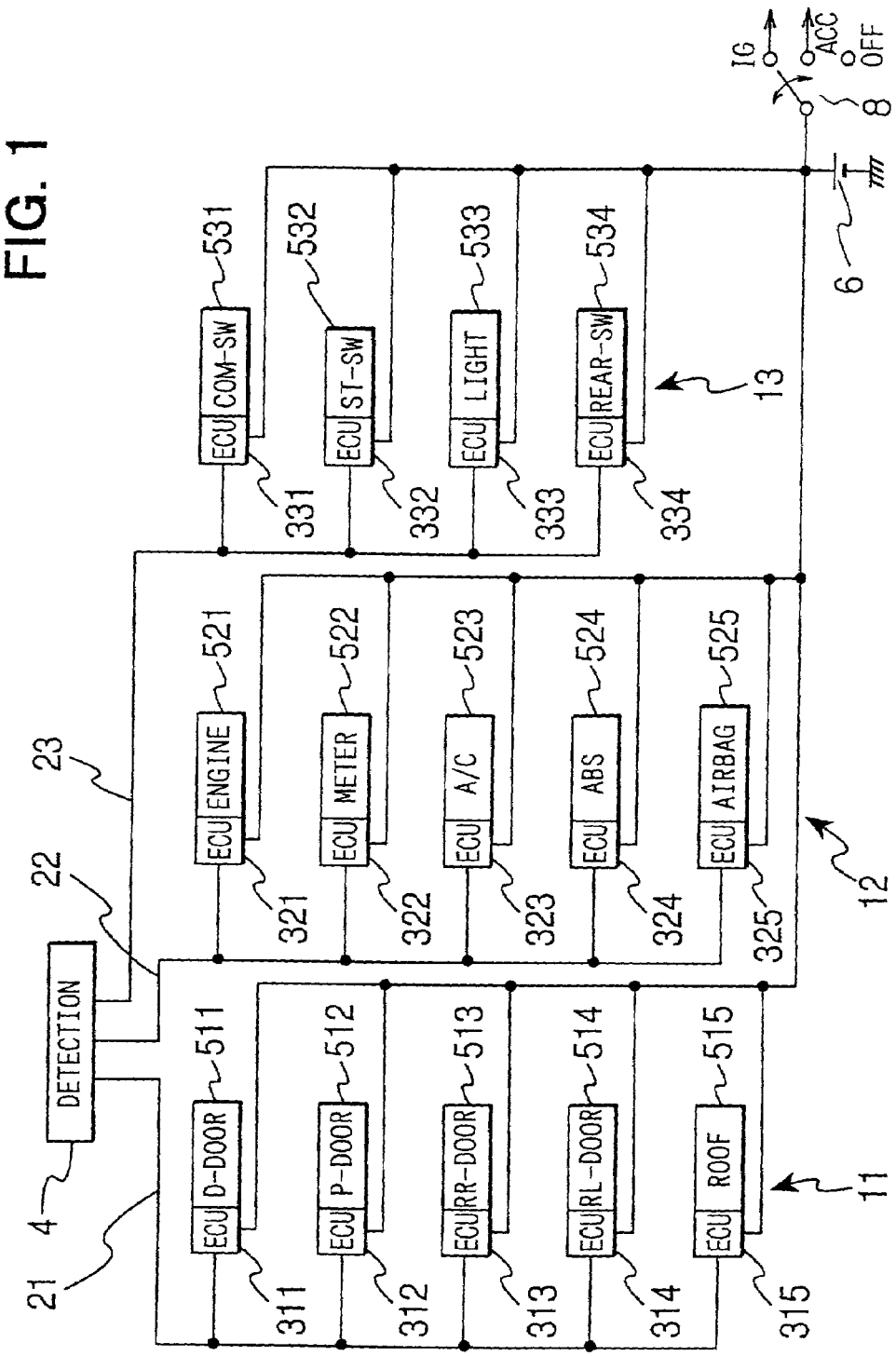
FIG. 1 is a block diagram of an abnormality detection system according to a first embodiment of the present invention.

The present invention will be described in further detail with reference to various embodiments which are applied to automotive vehicles. The same or similar parts in the following embodiments are designated by the same or similar reference numerals.

(First Embodiment)

Referring first to FIG. 1, an abnormality detection system comprises a plurality of (three) networks 11 to 13 and an abnormality detection unit 4 connected to the networks 11 to 13 through respective multiplex communication lines 21 to 23. The networks 11 to 13 include a plurality of nodes (ECUs: electronic control units) grouped into three. That is, the network 11 includes grouped ECUs 311 to 315 connected to ECU-controlled devices (controlled devices) 511 to 515, respectively. The network 12 includes grouped ECUs 321 to 325 connected to controlled devices 521 to 525, respectively. The network 13 includes grouped ECUs 331 to 334 connected to controlled devices 531 to 534, respectively.

The abnormality detection unit 4 is an electronic control unit (ECU) connected as one node to the networks 11 to 13 through the communication lines 21 to 23, respectively. The abnormality detection unit 4 is employed not only to collect abnormality information but also to operate as a data relay device among the networks 11 to 13. For instance, the detection device 4 relays data frames transmitted from the ECUs 331 to 334 in one of the networks 11 to 13 to the ECUs 331 to 334 in another of the networks 11 to 13.

In the first network 11 connected to the communication line 21, the ECUs 311, 312, 313 314 and 315 are for controlling respective control devices, that is, a front driver-side door 511, a front passenger-side door 512, a rear right-side door 513, a rear left-side door 514 and a roof 515. In the second network 12 connected to the communication line 22, the ECUs 321, 322, 323, 324 and 325 are for controlling respective controlled devices, that is, an engine 521, a meter 522, an air conditioner 523, an anti-lock brake system 524 and an airbag 525. In the third network 13 connected to the communication line 23, the ECUs 331, 332, 333 and 334 are for controlling respective control devices, that is, a combination switch 531, a steering wheel switch 532, a light switch 533 and a rear switch 534.

These ECUs 4 and 311 to 334 are connected to a battery 6 bypassing an ignition switch circuit including a key switch 8 to be continuously supplied with electric power in the similar manner as the controlled devices (doors, etc.) 511 to 515 which should be continuously maintained operable. Thus, the ECUs 311 to 334 are continuously held operable to execute data communication one another even while the key switch 8 is held at OFF position.

Each ECU 311 to 314 is constructed to transmit and receive data frames under a predetermined communication protocol such as BEAN. Each ECU 311 to 314 is further constructed to transmit two kinds of data frames, one shown in FIG. 3 and the other shown in FIGS. 4A and 4B, in addition to control data frames. The data frame includes data regions for main data and header region for additional information. In the BEAN protocol, for instance, the header region includes a priority region, a destination ID region and a data region.

Certain ECUs are held in a sleep mode to save consumption of electric power, when it is not required to execute a normal control. In this mode, the ECU only checks for a trigger information (e.g., bus signal, port input signal and electric power change) so that it may return to a normal mode for the control of its corresponding device in response to such a trigger information. For instance, even when a vehicle user turns off an engine and leaves a vehicle, the door ECUs 511 to 514 and the meter ECU 522 are required to be in the sleep mode.

The ECU is enabled to move to the sleep mode when no other ECUs send a sleep NG signal and a specified signal is at OFF level. Therefore, the ECU cannot move to the sleep mode if any one of the other ECU continues to send a sleep NG signal due to abnormality or for some other reasons.

Figure 3:
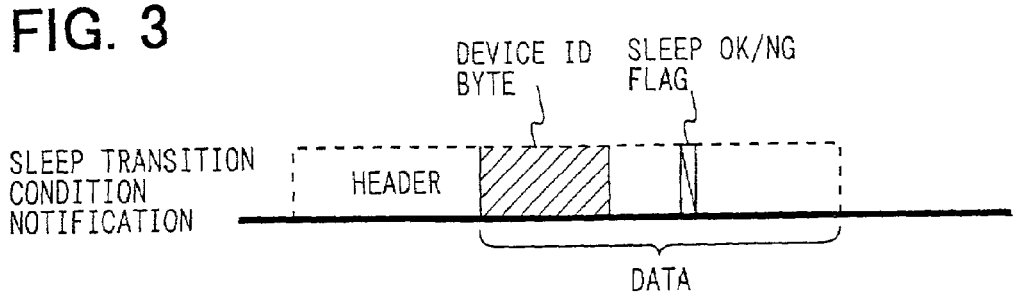
FIG. 3 is a diagram showing a data frame transmitted and received in the first embodiment.

The data frame of the first kind shown in FIG. 3 is a sleep transition condition notification frame which notifies whether each ECU 311 to 334 is ready for a transition to a sleep mode, that is, whether no cause of ECU activation exists. This notification frame has, in its data region, a region for an own device (ECU) ID at the first byte in the data region and a region for a sleep OK/NG flag at the second byte. The sleep OK/NG flag indicates whether the ECU is ready for the sleep mode. The flag may be set to "0" to indicate OK and "1" to indicate NG. This flag OK and NG may be determined based on whether a signal input to the input/output circuit (I/O) of each ECU is in the predetermined initial condition or has a data frame to be transmitted. If a sleep NG notification frame (flag "1") is transmitted, other ECUs 311 to 334 in the same network 11 to 13 maintains the same flag condition. Thus each network 11 to 13 is maintained in its own condition independently of other networks.

Figure 4A:
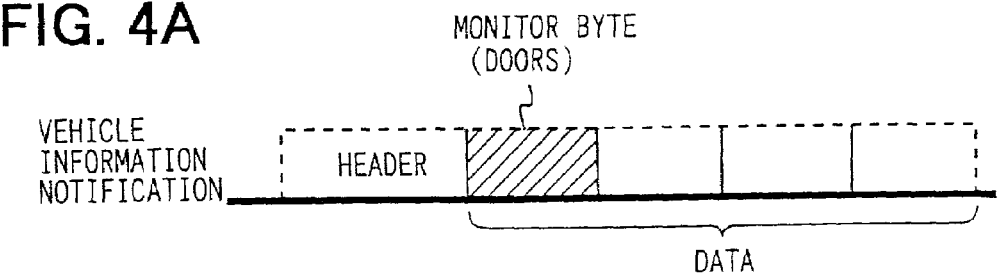
FIGS. 4A and 4B are diagrams showing other data frames transmitted and received in the first embodiment.
Figure 4B:
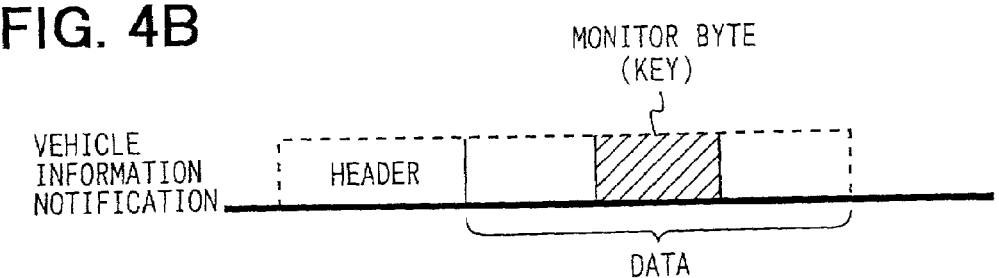

The data frame of the second kind shown in FIGS. 4A and 4B is a vehicle information notification frame which notifies the operation condition of the corresponding one of the controlled devices 511 to 534. The vehicle information notification frame has, in its data region, regions for monitor bytes indicating conditions of the controlled devices 511 to 534. For instance, a door open/close condition is provided as the first byte as shown in FIG. 4A and a key switch condition is provided as the second byte as shown in FIG. 4B. This vehicle information notification frame is transmitted following a transmission of the sleep NG notification frame.

Figure 2:
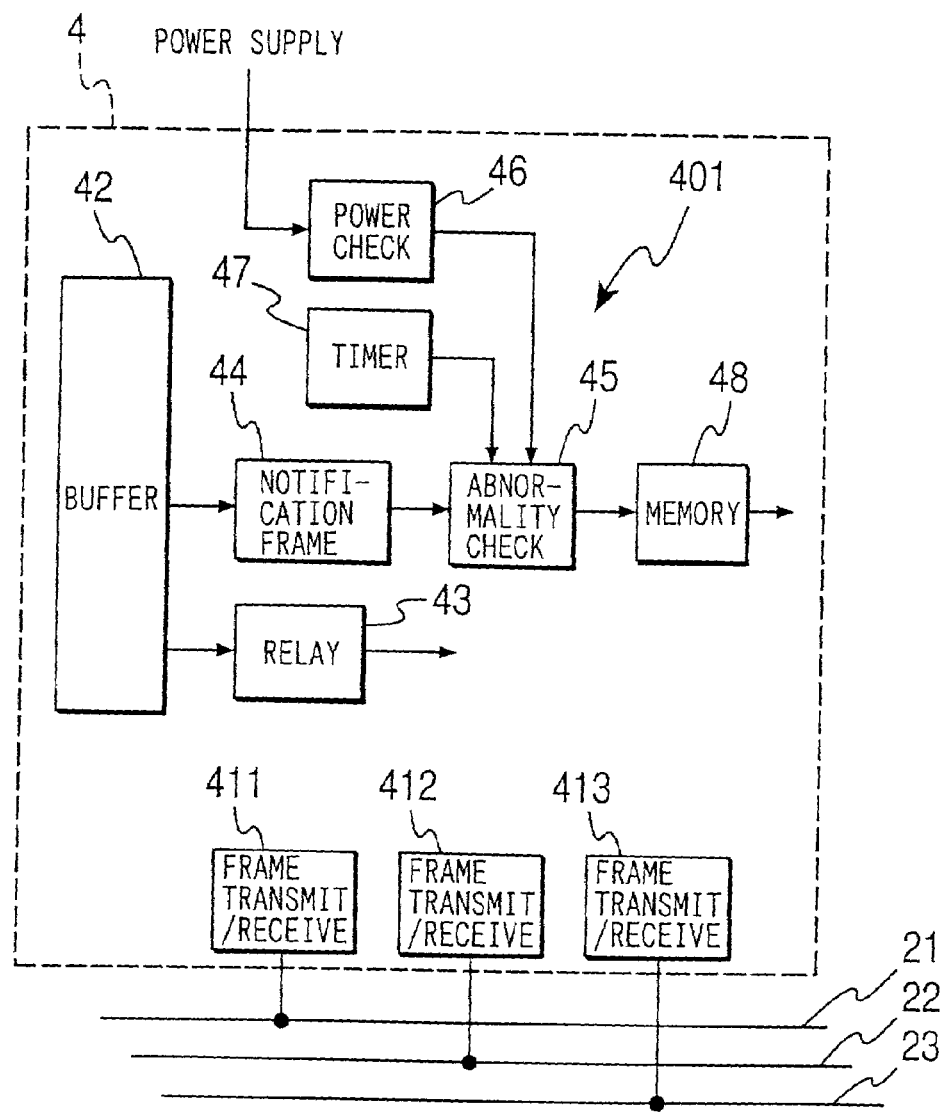
FIG. 2 is a block diagram of an abnormality detection unit used in the first embodiment.

The abnormality detection unit 4 is constructed with a microcomputer, a communication circuit and the like. This unit 4 is constructed functionally as shown in FIG. 2. Specifically, it has three frame transmission/reception parts 411 to 413 connected to the communication lines 21 to 23, respectively.

The detection unit 4 has a received frame storage buffer part 42 that stores the data frames received by the transmission/reception parts 411 to 413. The buffer part 42 may be provided in predetermined addresses of a RAM (not shown) of the microcomputer. The detection unit 4 has a relay processing part 43 that specifies the transmission/reception parts 411 to 413 which executes transmission of the stored data frame based on a relay destination table, when the stored data frame is a data frame to be relayed to the networks 11 to 13. The relay destination table defines the correspondence between the data ID of the stored data frame and the destination. The stored data frame is output to the specified transmission/reception parts 411 to 413 and transmitted to the corresponding network 11 to 13 from the transmission/reception parts 411 to 413.

The detection unit 4 has a notification frame processing part 44 that extracts the sleep OK/NG flag, the device ID and the vehicle information and outputs those to an abnormality check part 45, upon receiving the sleep transition condition notification frame and the vehicle information notification frame.

The detection unit 4 has a vehicle power supply check part 46 and a timer part 47 that are connected to the abnormality check part 45. The check part 46 receives a power supply voltage signal of a power supply system which becomes operative when an accessory switch is turned on (ACC-ON) by the key switch 8, and checks whether the ignition switch is turned off (IG-OFF) by the key switch 8. Thus, the check part 46 detects that the controlled devices 511 to 534 are rendered operative by turning the key switch 8 from its OFF position so that the accessory switch and the ignition switch are turned on (ACC-ON and IG-ON) sequentially. It also detects that the controlled devices 511 to 534 are rendered inoperative by returning the key switch 8 to the OFF position so that the ignition switch is turned off (IG-OFF).

Specifically, the check part 45 determines that the controlled device 511 to 534 corresponding to the ECU 311 to 334 which has transmitted the sleep NG notification frame has an abnormality, when the network 11 to 13 does not shift to the sleep mode for a predetermined time period T1 from the turning off of the ignition switch (IG-OFF). It then outputs the device ID of such an ECU 311 to 334 and the vehicle information to a memory part 48 as the abnormality monitor information. The memory part 48 includes an EEPROM, a flash ROM or a battery backed-up memory to store its storage content even when the power supply voltage is shut off. The time period T1 should be set to be longer than the wait time period required for each ECU 311 to 334 to shift to the sleep mode after the key switch 8 is turned to OFF position (IG-OFF). Thus the frame processing part 44, abnormality condition check part 45, vehicle power supply check part 46 and timer part 47 form an activated unit detection section 401.

Figure 5:
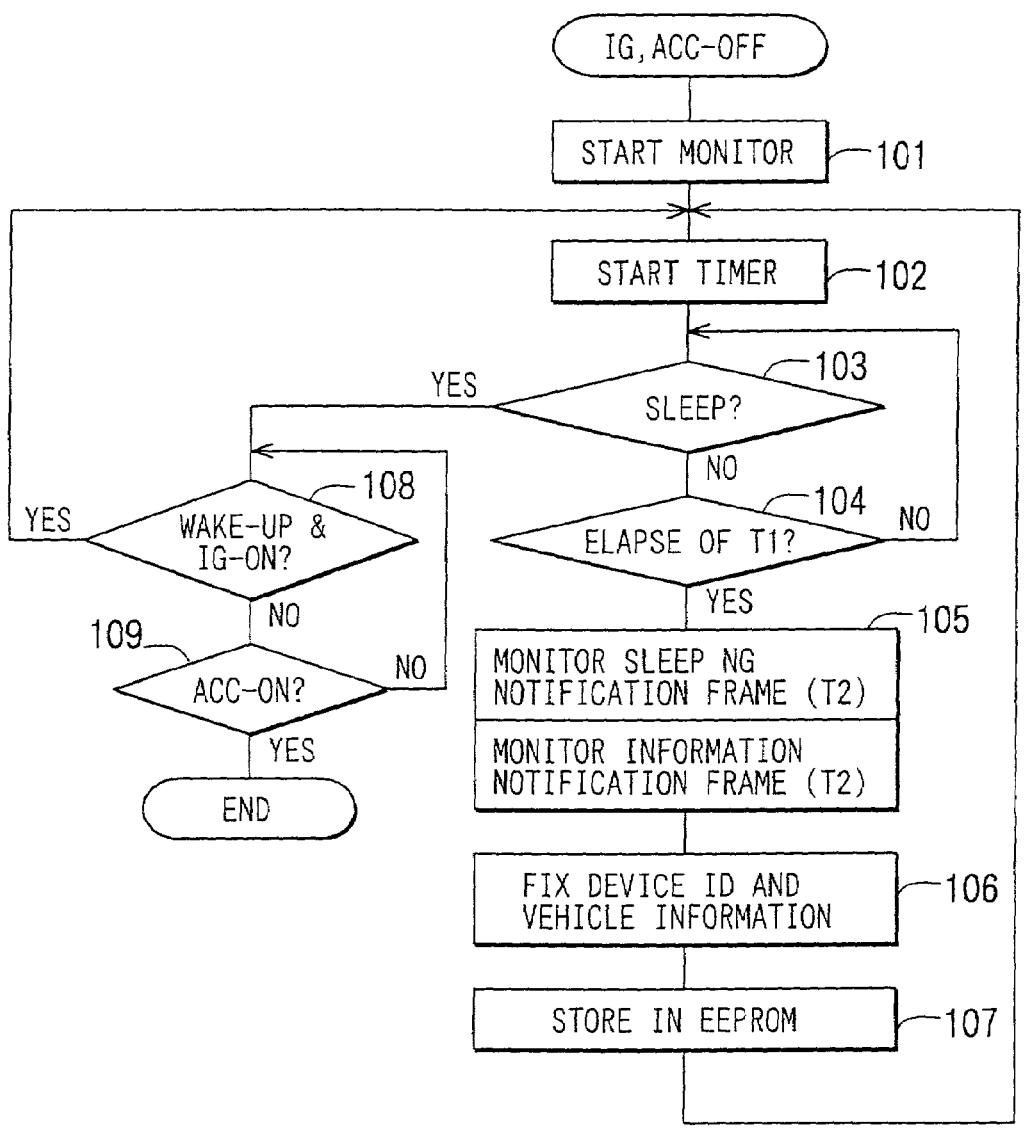
FIG. 5 is a flow diagram showing an operation sequence of the abnormality detection unit shown in FIG. 2.

The detection unit 4, particularly its microcomputer, is programmed to operate as shown in FIG. 5. When the key switch 8 is turned to the OFF position (IG-OFF), the power check part 46 detects it the monitor processing starts at step 101. The timer part 47 starts counting elapse of time at step 102. The frame processing part 44 checks at step 103 whether the ECUs 311 to 334 are allowed to shift to the sleep mode. It is determined that the ECUs 311 to 334 are enabled to shift to the sleep mode when the sleep OK notification frames have been received from all the ECUs 311 to 334. With the NO determination at step 103, the abnormality check part 45 checks at step 104 whether the counted time is more than the predetermined time T1, that is, whether the predetermined time T1 has elapsed.

With the YES determination at step 104 indicating that the sleep mode is disabled for more than the predetermined time T1, the frame processing part 44 monitors at step 105 the sleep NG notification frame and the vehicle information notification frame for a subsequent time period T2. Thus, the frame processing part 44 extracts the device ID of the ECUs 311 to 334 which is disabled to shift to the sleep mode as well as the vehicle information, and outputs these extracted data to abnormality check part 45. This is repeated for every ECU 331 to 334 which has not shifted to the sleep mode. The abnormality check part 45 then fixes such device IDs and vehicle information at step 106, and outputs these data to the memory part 48 to be stored therein at step 107. The above steps 102 to 07 are repeated by resetting the timer part 47 each time.

With the YES determination at step 103 indicating that all the ECUs 311 to 334 are allowed to shift to the sleep mode, the detection unit 4 shifts to the sleep mode. In this instance, it is checked at step 108 whether a wake-up frame is received and whether the key switch 8 is turned on. If the wake-up frame is received (YES: step 108) due to, for instance, opening of a door, the detection unit 4 starts the processing from step 102. If the check result at step 108 is NO indicating that no wake-up frame is received and the IG-OFF condition continues (NO: step 108), the detection unit 4 further checks at step 109 whether the key switch 8 is turned to ACC-ON. As long as the key switch 8 remains turned off (NO: step 109), the detection unit 4 continues the sleep mode. If the power check part 46 detects that the key switch 8 is turned to ACC-ON position (YES: step 109), the detection unit 4 determines that the controlled devices 511 to 534 are to be driven by a vehicle driver, and ends the above processing.

As described above, the detection unit 4 detects the ECU 311 to 334 that remains activated for more than the wait time period required to shift to the sleep mode after the IG-OFF condition, and stores the operation conditions of the corresponding controlled devices 511 to 534.

When the key switch 8 is turned to OFF position (IG-OFF), all the ECUs 31 to 334 will normally shift to the sleep mode after elapse of the time period T1 from IG-OFF unless a door is operated or the like. If one or some of the controlled devices 51 to 534 have abnormality, the corresponding ECUs 311 to 334 are not allowed to shift to the sleep mode. It is therefore possible to identify at repair shops or the like the controlled device 511 to 534 which is likely to be abnormal from the corresponding ECU 31 to 334 without analyzing a large amount of data. The detail of abnormality can be retrieved from the vehicle information stored with the device ID in the memory part 48.

If one ECU fails and all the ECUs 311 to 334 in the same network 11 to 13 remains activated without shifting to the sleep mode, the battery 6 will run down and be replaced with the new one. Each ECU 311 to 334 are reactivated by a power-on reset operation in the conventional manner. Thus, the same abnormality may not appear again. Even in such a case, abnormality diagnosis can be effected by retrieving the abnormality information stored in the memory part 48.

Figure 6:
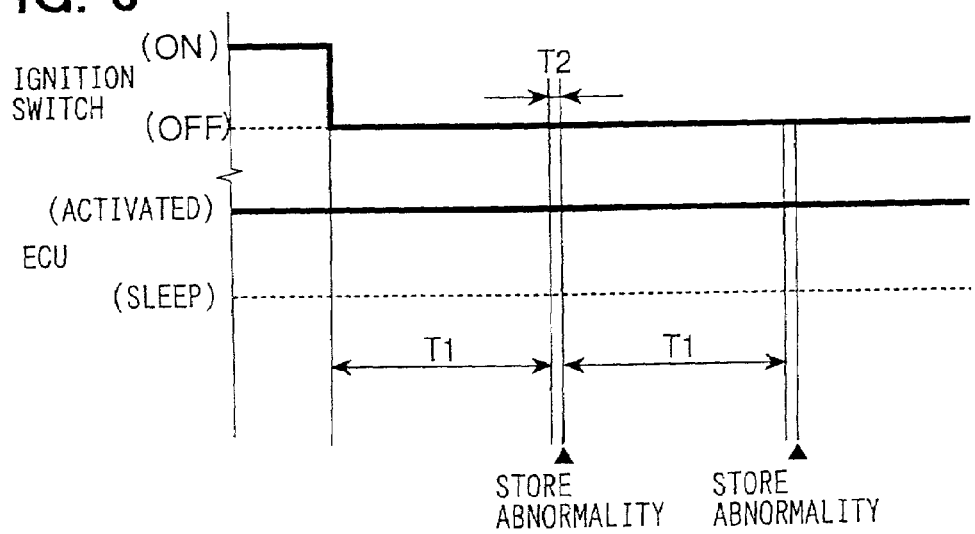
FIG. 6 is a timing diagram showing an operation of the abnormality detection unit shown in FIG. 2.

If any ECU 311 to 334 remains activated after the key switch 8 is turned to OFF position, it can be detected after the time period T1. As steps 102 to 107 are repeated, so that the device ID and the vehicle information are stored in the memory 48 as shown in FIG. 6 each time abnormality is detected. This is for the purpose to distinguish the continuing activation of the ECUs 311 to 334 between the case in which the controlled devices 511 to 534 have abnormalities actually and the case in which the ECUs 311 to 334 are activated by a driver's operation of the door 511 or the like. That is, the ECU 311 to 334 continues to be activated if the corresponding controlled device 511 to 534 actually has abnormality. However, the ECU 311 to 334 soon shifts to the sleep mode if the door 511 is operated for a moment. Therefore, the number of detection and storage in the memory 48 of the activated condition of the ECU 31 to 334 is limited unless the abnormality exists continuously.

(Second Embodiment)

In the second embodiment, the abnormality detection system is constructed similarly to the first embodiment. However, the abnormality detection unit 4 is constructed to stop its monitor processing, once it detects the ECU 311 to 334 remaining activated for the time period T1 and stores the device ID and the vehicle information of such an ECU 311 to 334. Specifically, the abnormality detection unit 4 is programmed not to repeat steps 102 to 107. Thus, the storage capacity of the memory part 48 that stores the device ID and the vehicle information can be reduced.

According to this embodiment, the monitor period is only during the time period T1 after IG-OFF. It is required not to erroneously detect the activated condition of the ECUs 311 to 334 caused by driver's door operation or the like other than the actual abnormality of the controlled devices 511 to 534. Therefore, the time period T is preferably set to a sufficiently long period which is normally required for a driver to leave a vehicle.

(Third Embodiment)

In the third embodiment, the abnormality detection system is constructed similarly to the first embodiment. However, the ECUs 311 to 334 are constructed to transmit only the sleep transition condition notification frame (FIG. 3) without transmitting the vehicle information notification frames (FIGS. 4A and 4B). Further, the abnormality detection unit 4 is programmed not to execute processing related to the vehicle information notification frames. That is, the notification frame processing part 44 executes processing of extracting the sleep OK/NG flag and the device ID only. The abnormality check part 45 outputs only the extracted device ID to the memory part 48 to be stored as the abnormality monitor information.

According to this embodiment, the abnormality detection unit 4 does not check the controlled devices 511 to 534 for respective abnormalities. However, the storage capacity of the memory part 48 can be reduced. The storage capacity of the memory part 48 can be reduced further by limiting the detection of ECUs remaining activated to only once after IG-OFF as in the second embodiment.

(Fourth Embodiment)

Figure 7:
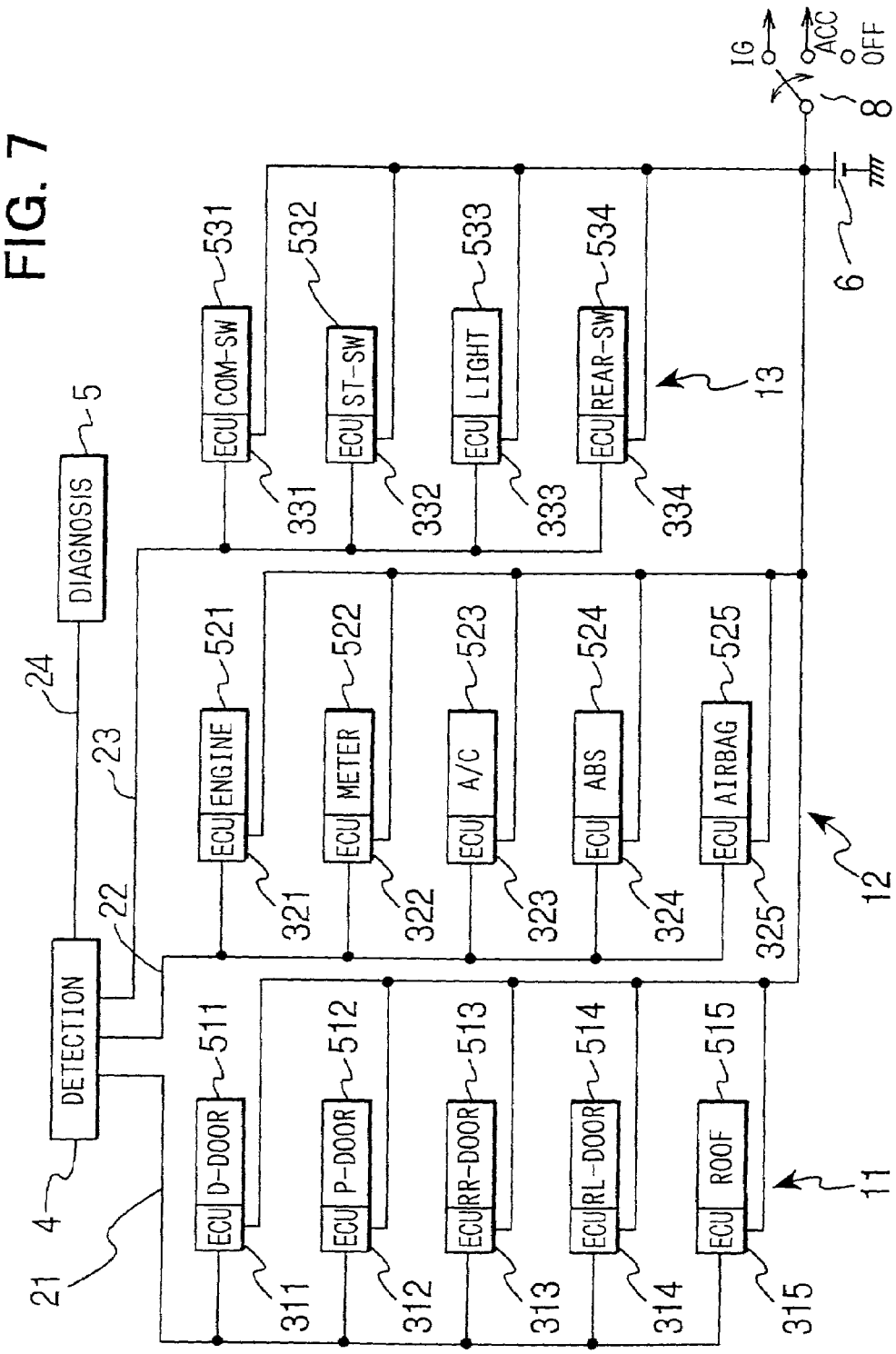
FIG. 7 is a block diagram of an abnormality detection system according to a fourth embodiment of the present invention.
Figure 8:
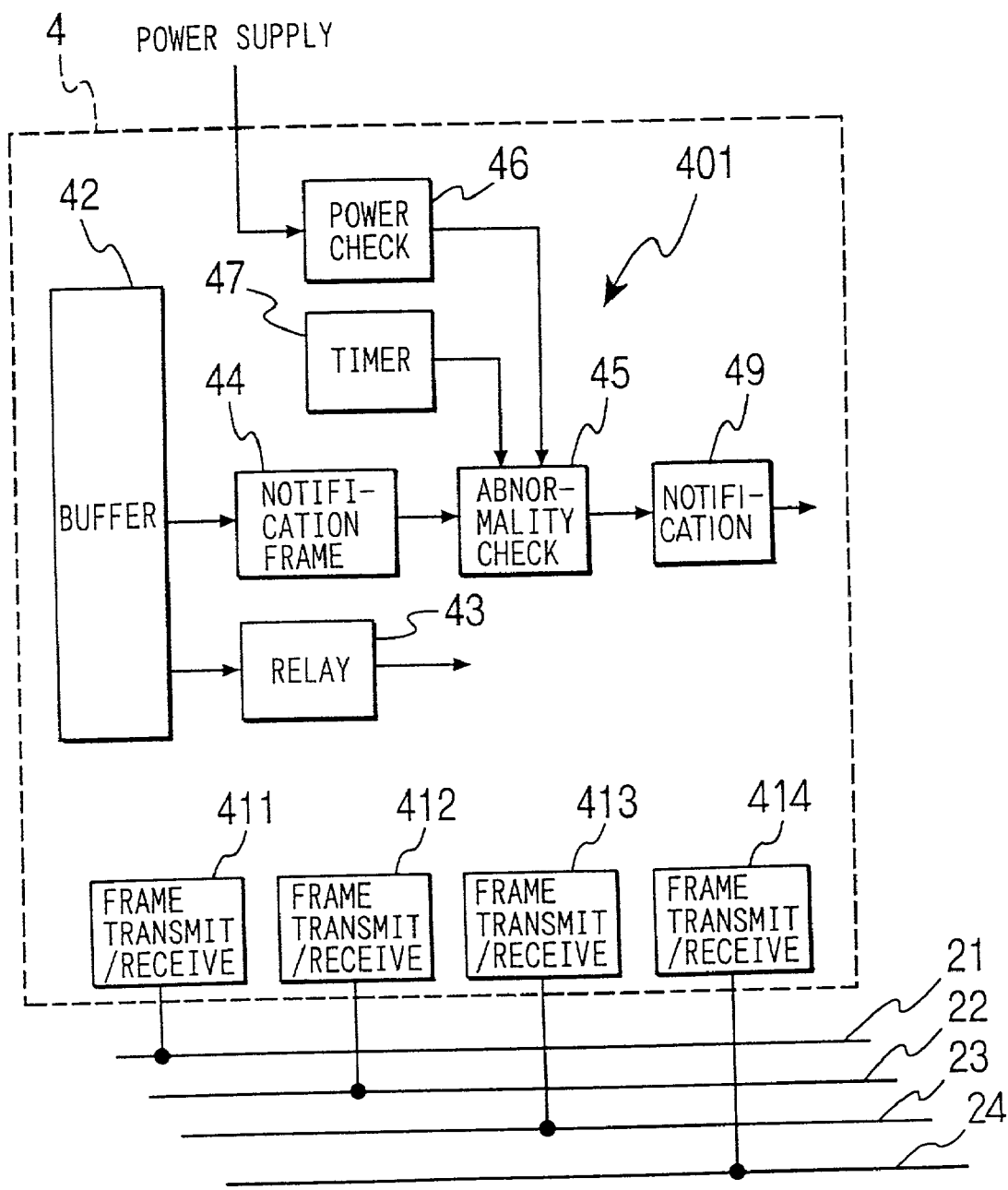
FIG. 8 is a block diagram of an abnormality detection unit used in the fourth embodiment.

In the third embodiment, the abnormality detection system is constructed similarly to the first embodiment. However, as shown in FIG. 7, the abnormality detection unit 4 is connected to an abnormality diagnosis unit 5 via a communication line 24. Further, as shown in FIG. 8, the abnormality detection unit 4 has a frame transmit/receive part 414 connected to the communication line 24, and a notification processing part 49 in place of the memory part 48 (FIG. 2). Thus, when the notification processing part 49 receives the device ID and the vehicle information fixed by the check part 45 (step 106 in FIG. 5), it transmits these data to the malfunction diagnosis unit 5 through the frame transmit/receive part 414 and the communication line 24 as the abnormality information. The diagnosis unit 34 thus collects the abnormality information.

It is possible to notify a driver of the abnormality information by displaying the same on a warning indicator such as a display unit in a vehicle compartment. It is also possible to connect the diagnosis unit 34 to communication lines 21 to 23 to eliminate the communication line 24 and the frame transmit/receive part 414.

(Other Embodiments)

In the above embodiments, the abnormality detection unit 4 may be constructed to have no data relay function and connected as one node of one of a plurality of networks 11 to 13. Further, a plurality of ECUs 31 to 334 may be grouped to one network.

As long as the vehicle information identifies the controlled devices 511 to 534, the sleep transition condition notification frame may have a region of vehicle information in place of the device ID. In this instance, the abnormality detection unit 4 may be constructed to extract such vehicle information as information identifying an ECU remaining activated and store the extracted vehicle information.

The operation stop of the controlled devices 511 to 534 may be determined by a door locking operation or a combination of the key switch condition and the door locking operation, in place of checking the key switch condition by the power check part 46.

The present invention should not be limited to the above embodiments but may be modified and altered in many other ways without departing from the spirit of the invention.

What is claimed is:

1. An abnormality detection system comprising:
a network including a plurality of electronic control units for respective controlled devices, the control units being constructed to transmit respective data frames;
a communication line; and
an abnormality detection unit connected to the network through the communication line for collecting abnormality monitor information of the controlled devices based on the transmitted data frames,
wherein the control units are constructed to shift to a sleep mode after a predetermined wait period under a condition that no activation cause is present,
wherein the control units are constructed to transmit, in the data frames, identification information thereof and sleep not good information indicative of sleep disablement when the activation cause is present, and
wherein the detection unit includes transition detection means for detecting a transition of the controlled devices from an operation condition to an operation stop, and activated unit detection means for monitoring the transmitted sleep not good information after the controlled devices shifted to the operation stop condition and detecting the control unit which remains activated after the predetermined wait period.

2. The abnormality detection system as in claim 1, wherein:
the detection unit further has memory means,
the activated unit detection means is constructed to monitor repeatedly the transmitted sleep not good information at every predetermined interval longer than the predetermined wait period for detecting the control unit remaining activated, and outputs the identification information of the activated control unit sequentially to the memory means to be stored therein as the abnormality monitor information.

3. The abnormality detection system as in claim 1, wherein:
the detection unit further has memory means for storing therein the identification information of the activated control unit as the abnormality monitor information.

4. The abnormality detection system as in claim 3, wherein:
the control units are constructed to transmit in the data frames, in addition to the sleep not good information, condition information indicative of operation of the controlled device which disables the sleep operation; and
the memory means stores the condition information as the abnormality monitor information.

5. The abnormality detection system as in claim 1, wherein:
the control units are programmed to control vehicle operations through the controlled devices mounted in a vehicle; and
the abnormality detection unit and the control units are continuously supplied with electric power from a battery irrespective of operation of a key switch of the vehicle, so that the control units and the abnormality detection unit are allowed to continuously communicate one another.

6. An abnormality detection method including a plurality of electronic control units for respective controlled devices and an abnormality detection unit connected to the control units through a communication line, the method comprising the steps of:
continuously supplying the control units and the detection unit with electric power to enable communication one another even when respective controlled devices are in operation stop condition;
transmitting a sleep information from each control unit along with its unit ID to indicate whether it is allowed to shift to a sleep mode from an activated mode;
monitoring the sleep information of each ECU to detect the control unit remaining activated for more than a wait period required for the control unit to shift to the sleep mode; and
storing the unit ID of the ECU which is detected as remaining activated so that any abnormal location may be specified by the stored unit ID, wherein
the monitoring step and the storing step are repeated at every predetermine interval longer than the wait period.

7. The abnormality detection method as in claim 6, wherein:
the supplying step, the transmitting step, the monitoring step and the storing step start after a key switch of a vehicle is turned off.

* * * * *